Figure 8:
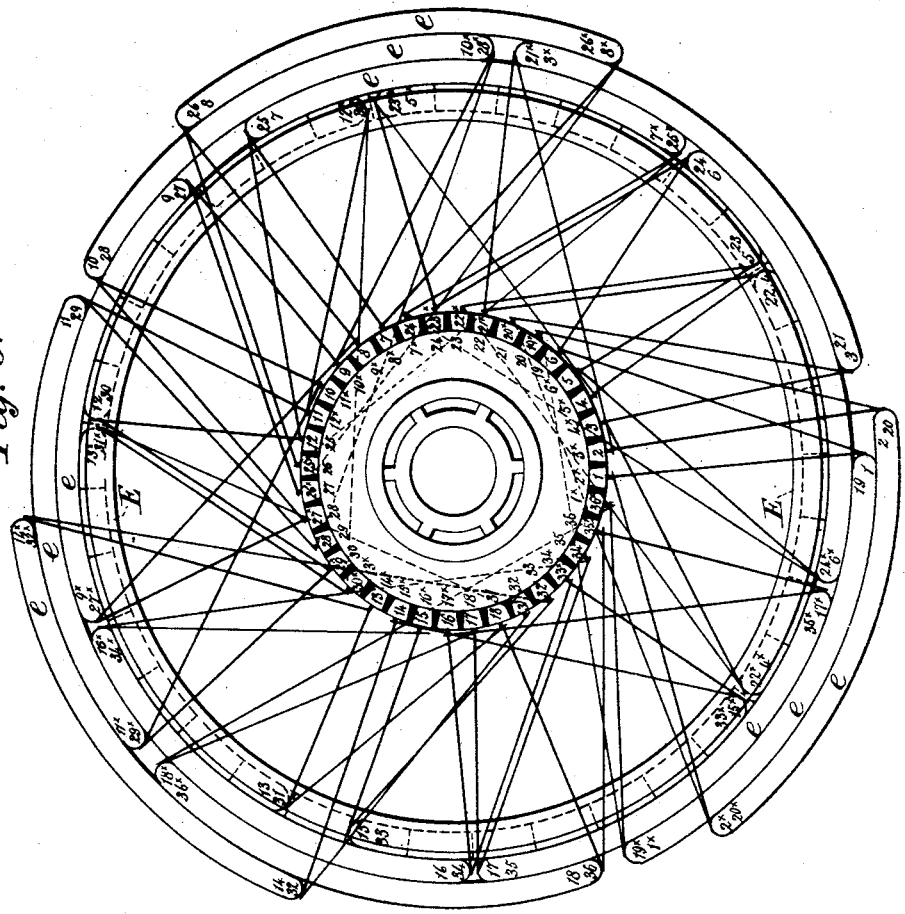

(No Model.) 8 Sheets—Sheet 1.
W. B. F. ELPHINSTONE & C. W. VINCENT.
DYNAMO ELECTRIC MACHINE.
No. 284,288. Patented Sept. 4, 1883.
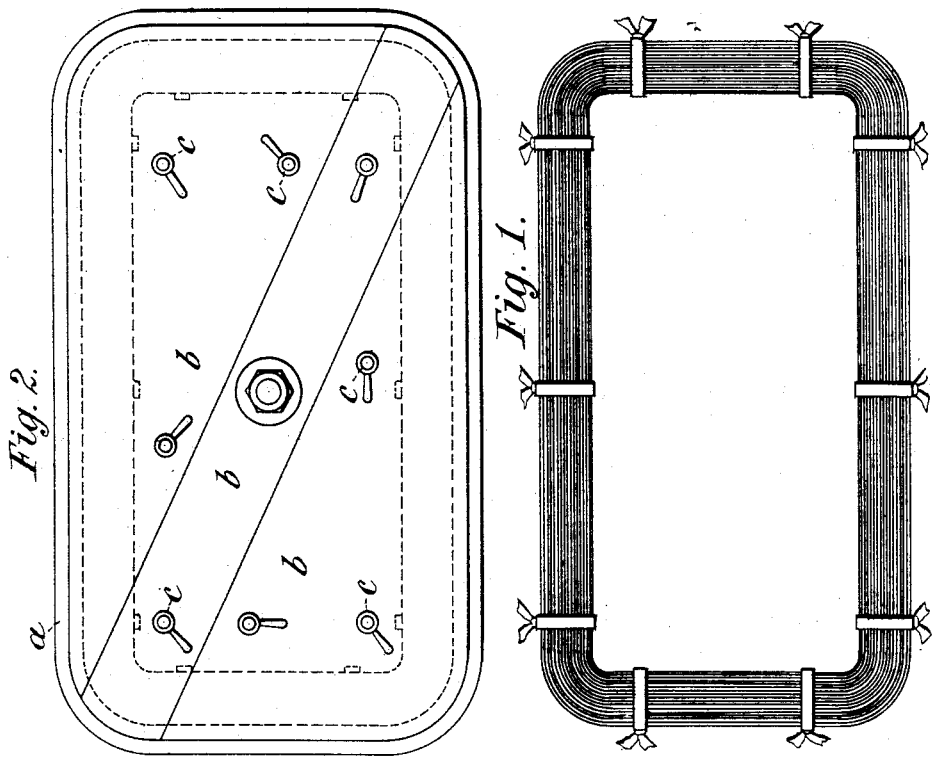
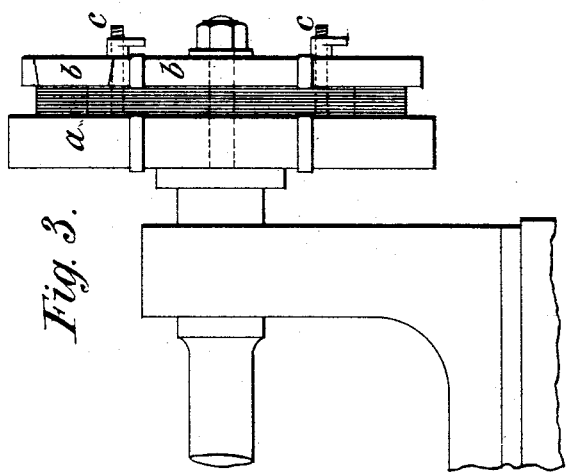
Witnesses:
Inventors:

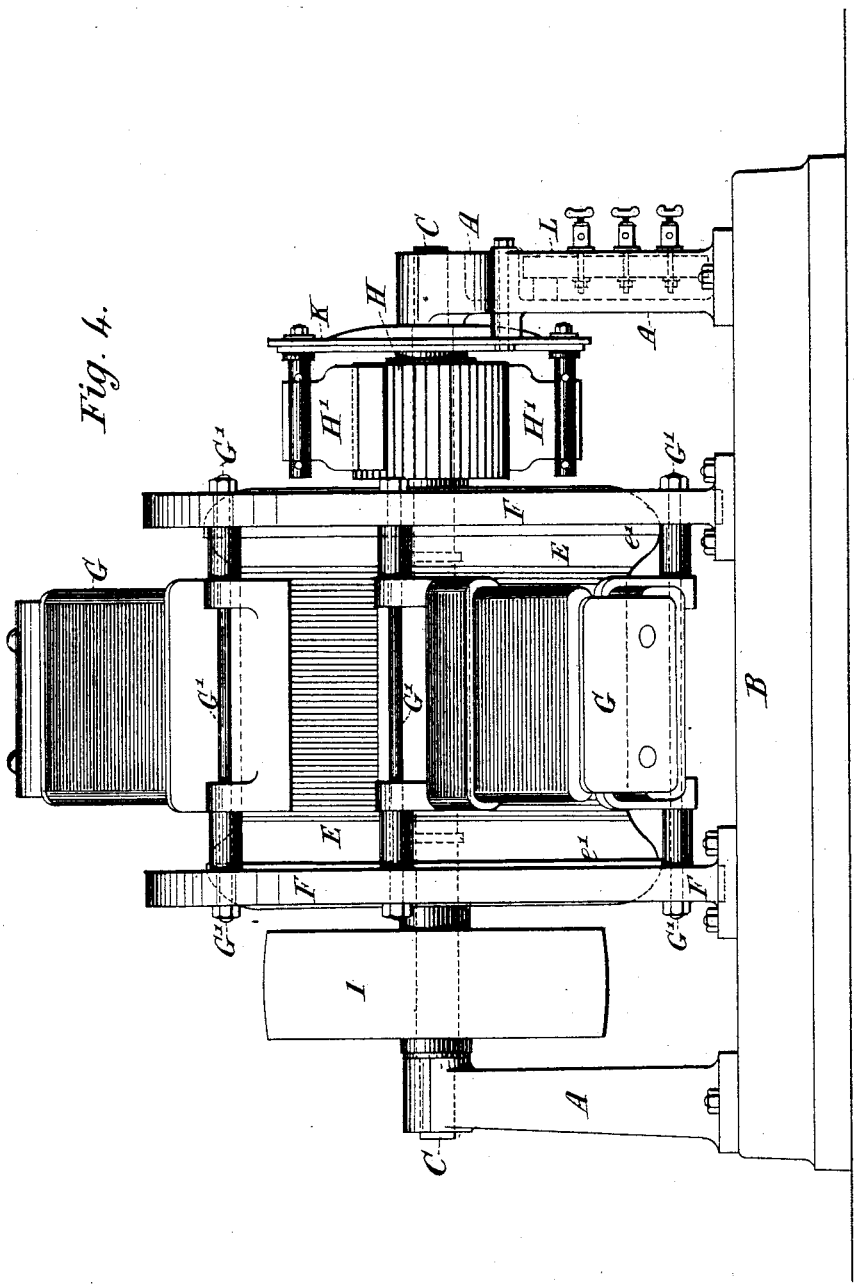

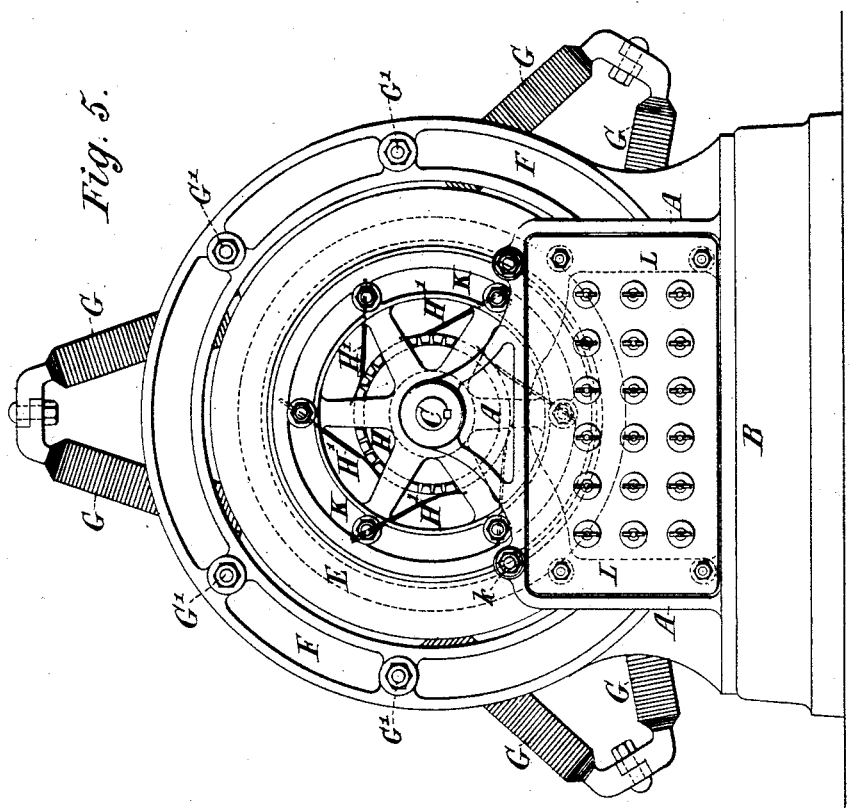

(No Model.) 8 Sheets—Sheet 4.
W. B. F. ELPHINSTONE & C. W. VINCENT.
DYNAMO ELECTRIC MACHINE.
No. 284,288. Patented Sept. 4, 1883.
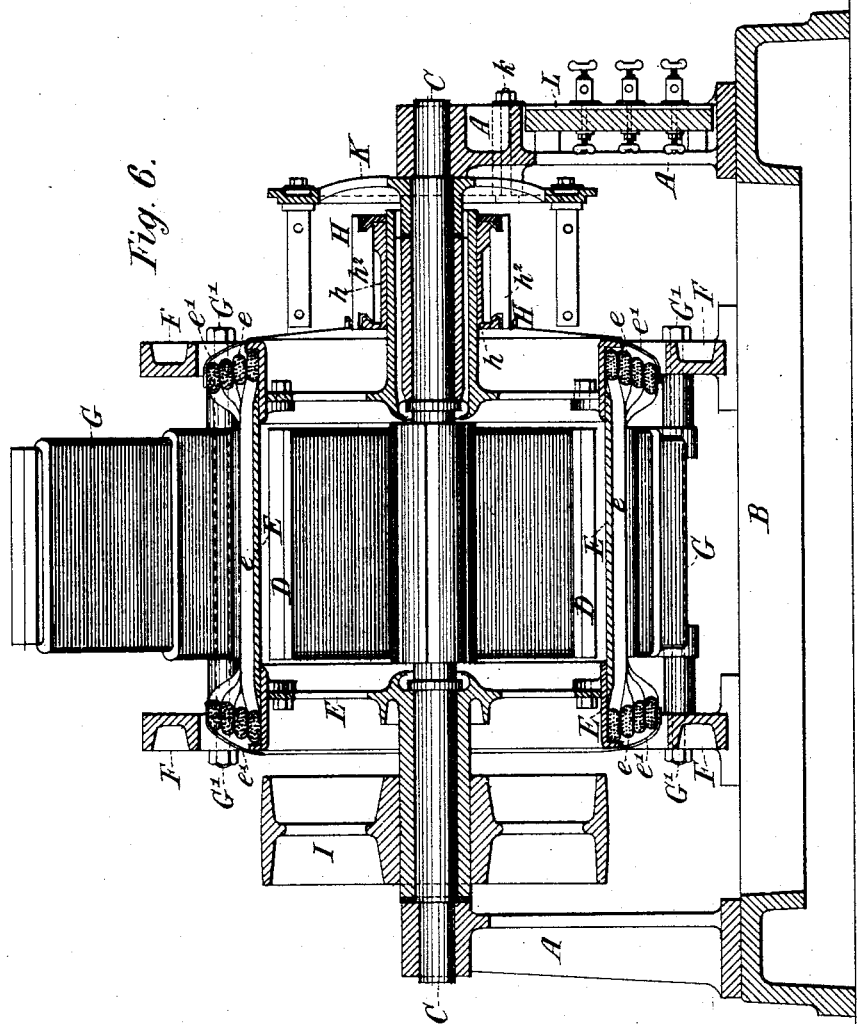

(No Model.) 8 Sheets—Sheet 5.
W. B. F. ELPHINSTONE & C. W. VINCENT.
DYNAMO ELECTRIC MACHINE.
No. 284,288. Patented Sept. 4, 1883.
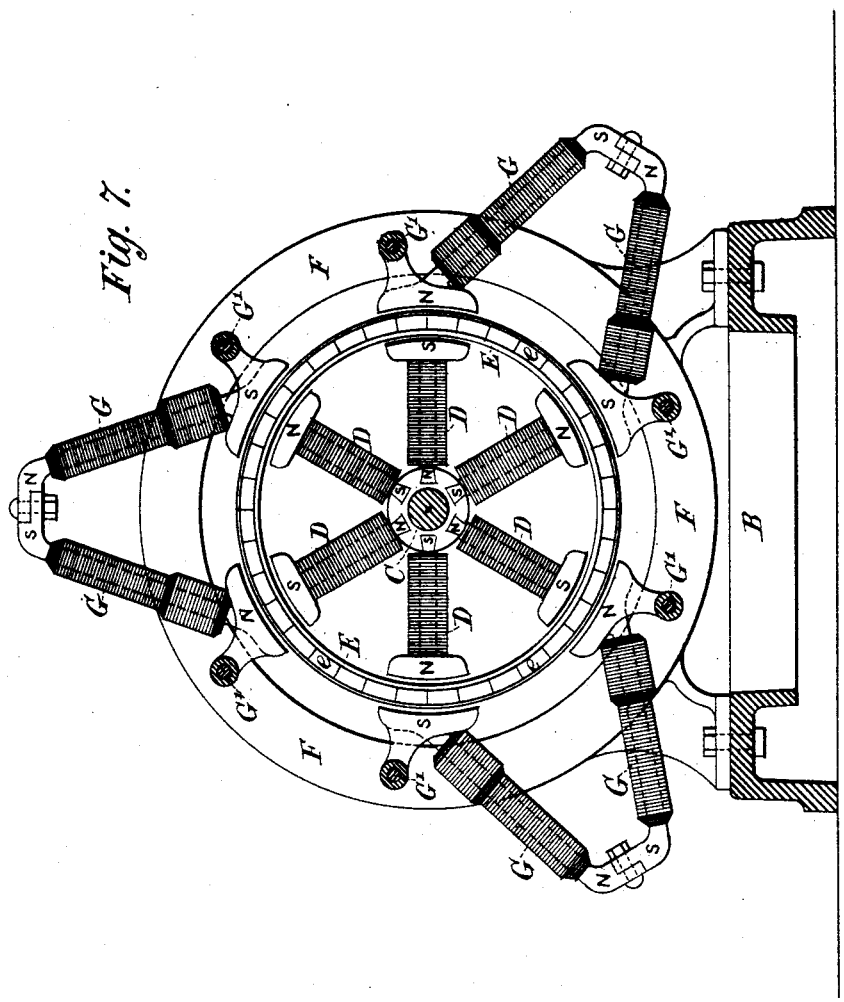

(No Model.)  
W. B. F. ELPHINSTONE & C. W. VINCENT.  
DYNAMO ELECTRIC MACHINE.  
No. 284,288. Patented Sept. 4, 1883.

(No Model.) 8 Sheets—Sheet 7.
W. B. F. ELPHINSTONE & C. W. VINCENT.
DYNAMO ELECTRIC MACHINE.
No. 284,288. Patented Sept. 4, 1883.
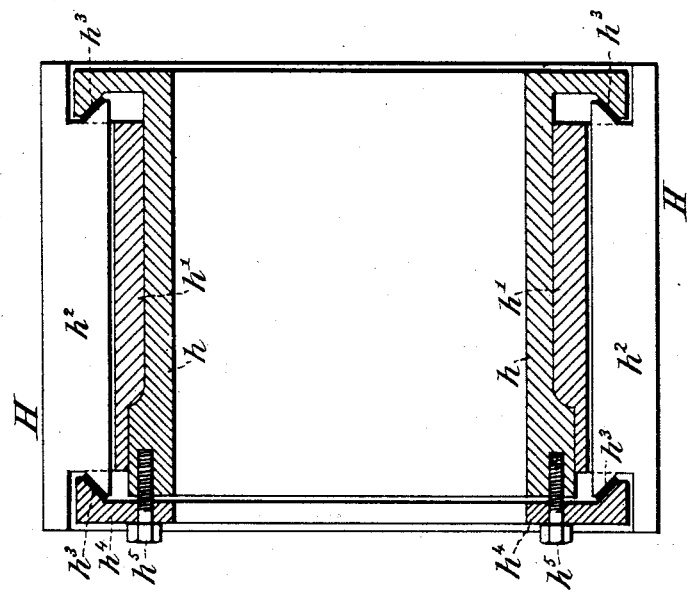
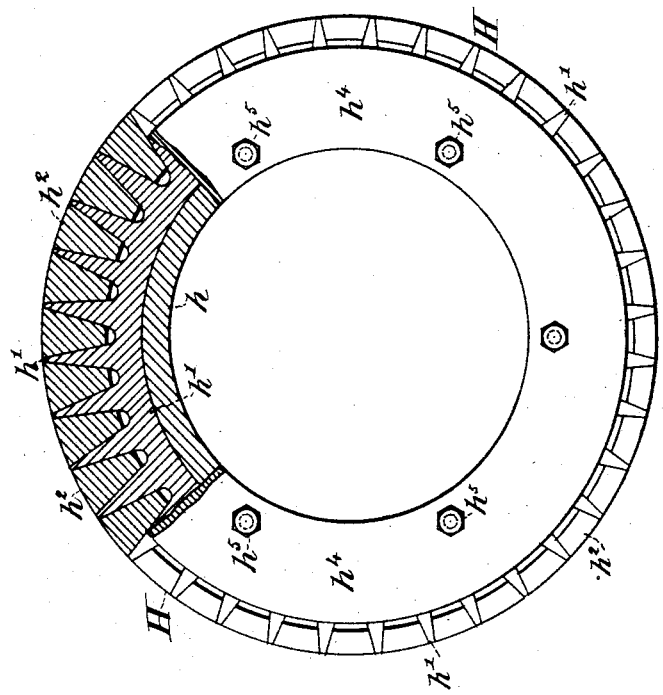

(No Model.) 8 Sheets—Sheet 8.
W. B. F. ELPHINSTONE & C. W. VINCENT.
DYNAMO ELECTRIC MACHINE.
No. 284,288. Patented Sept. 4, 1883.
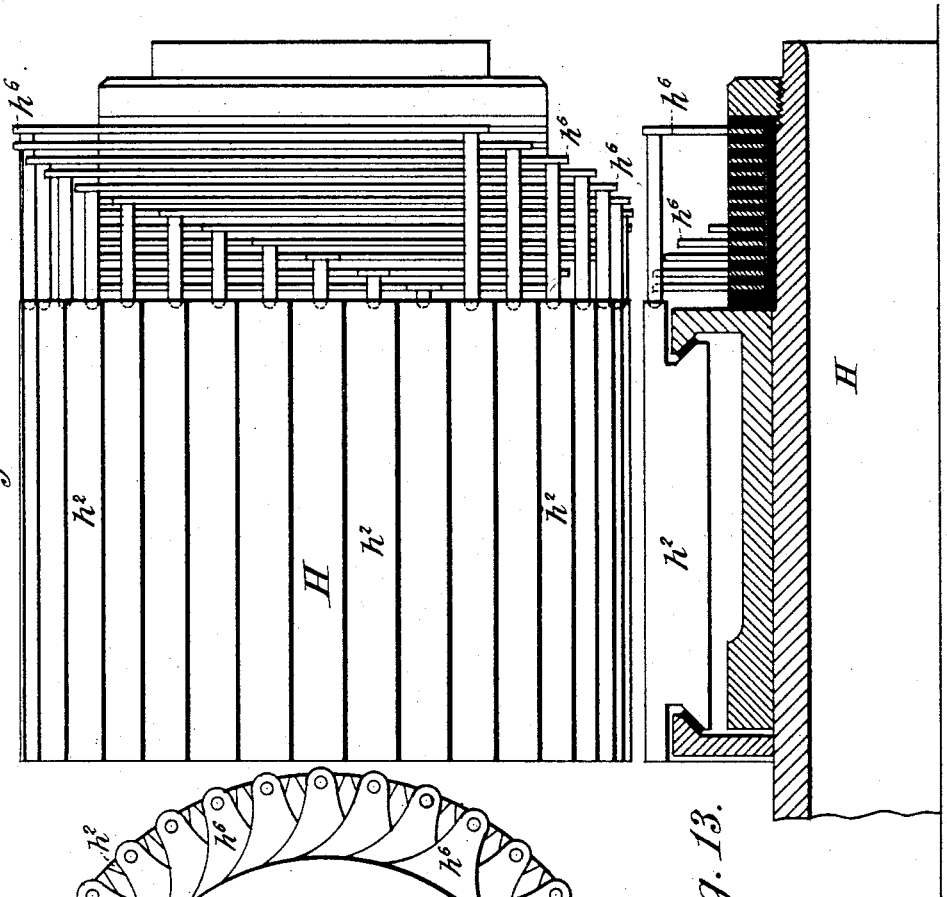
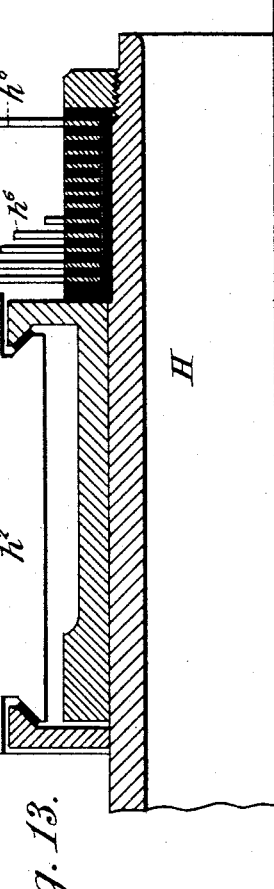
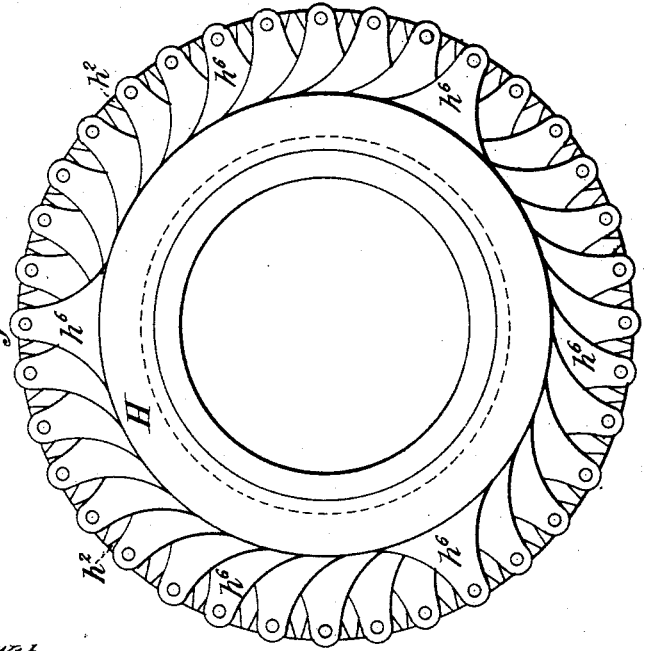

UNITED STATES PATENT OFFICE.

WILLIAM B. F. ELPHINSTONE, OF MUSSELBURGH, SCOTLAND, AND CHARLES W. VINCENT, OF HOLLOWAY, COUNTY OF MIDDLESEX, ENGLAND.

DYNAMO-ELECTRIC MACHINE.

SPECIFICATION forming part of Letters Patent No. 284,288, dated September 4, 1883.

Application filed February 16, 1883. (No model.) Patented in England May 18, 1882, No. 2,340.

*To all whom it may concern:*

Be it known that we, WILLIAM BULLER FULLERTON ELPHINSTONE, Baron ELPHINSTONE, of Carberry Tower, Musselburgh, North Britain, and CHARLES WILSON VINCENT, of Holloway, in the county of Middlesex, England, have invented certain new and useful Improvements in the Construction of Dynamo-Electric Machines, of which the following is a specification.

This invention relates to improvements in the construction of dynamo-electric machines of the class for which we have applied for Letters Patent in the United States.

Hitherto it has been customary to wind the coils or hanks of the armature *in situ*, which was a tedious and expensive process, and presented this further objection that they formed an obstacle to the removal of the internal field-magnets.

The form of the coils or hanks used in our machine is that of a broad link composed of one or more wires, and it is now proposed to wind each coil on a "former," making it of suitable length to fit the armature-drum, as before.

Figure 1 shows a coil or hank of the form which we employ. Fig. 2 is a side view, and Fig. 3 an edge view, of the former on which this hank is wound. Figs. 4, 5, 6, and 7 are several views of our improved construction of dynamo-electric machine complete. Fig. 8 is an elevation of the commutator end of the drum. Figs. 9 and 10 show detached views of the commutator; and Figs. 11, 12, and 13 show an arrangement of coupling-plates applied to the commutator.

The former consists of a base-board, *a*, which is to be mounted on a mandrel, and of a molding-block, *b*, which is made fast by screws and fly-nuts *c c* to the base-board. This molding-block is composed of three loose pieces, (see Fig. 2,) the middle piece lying diagonally and being slightly chamfered inward at its contact-edges, to facilitate by its removal the withdrawal of the hank from the molding-block when that block is detached from the base-board. The wire to be formed into the coil or hank is first coated with cotton yarn in the usual way. It is then passed through a bath of insulating material—such as asphalt dissolved in liquid hydrocarbon, or of any approved insulating compound—and while still wet from the bath the wire is coiled upon the former short lengths of tape, having been first placed transversely around the former to receive the wire. When the requisite length of wire has been coiled into the hank, the hank is bound by the tapes to keep the coils together, and the former is removed from the mandrel and placed in a drying-chamber to evaporate the solvent therefrom. When the insulating material has set or hardened, the hank is removed from the former, and it then presents the appearance of Fig. 1. In fitting it to the armature-drum it will, however, be necessary to bend the ends of the hank, in order that they may overlie the one the other snugly and be secured by bands or clips to the drum ends. To facilitate this bending of the ends, heat in the form of a current of electricity is applied to each hank to soften it, and while in this soft state the hanks are molded by pressure on the drum to the form required. Instead of bending the ends of the coils, as heretofore, over the ends of the drum, we now increase the length of the drum and lay out the hanks upon the drum, and we thereby facilitate access to the interior of the drum for the purpose of withdrawing the internal magnet.

In order to provide for a given diameter of drum, taking the maximum number of coils or hanks, the coils have hitherto been caused to overlap each other, and thereby cover the whole periphery of the drum. We still adhere to this arrangement, but keep the sides of the hanks at a uniform level, while the ends, by overlapping, form ridges. These ridges will, however, be external to the plane occupied by the field-magnets, and we cover them by a pair of hoops or belts, which will serve to retain the hanks in position. This arrangement is illustrated in the drawings, where Fig. 4 shows in side elevation the improved form of our dynamo-electric machine. Fig. 5 is an elevation of the commutator end of the same. Fig. 6 is a longitudinal sectional elevation, and Fig. 7 is a transverse vertical section, of the machine. In these figures, A A are standards bolted to the bed-plate B, and carrying a fixed shaft, C. To this shaft are fitted radial plates of soft iron, D D, constituting the stationary internal magnets.

Mounted loosely upon the shaft C, and surrounding the magnets D, is an armature-drum, E. The heads of this drum consist of open disks, formed with elongated hubs or sleeves fitting onto journals on the shaft C. The heads are connected to the barrel of the drum (which is made of some diamagnetic material, such as mill-board) by screws inserted in its periphery, or in any other convenient manner.

Surrounding the drum are hanks of insulated wire, $e$, laid longitudinally thereof. The way of arranging these hanks and of bringing down the terminals of the hanks is clearly shown in Figs. 6 and 8. The armature-drum is situate between the side frames, F F, which are bolted to the bed-plate B. The use of these side frames is to carry the magnets G G, which surround the armature-drum and constitute the outside field. These magnets G are composed of plates of soft iron, and are V-shaped in cross-section, which mode of construction is adopted to facilitate the winding on of the insulated wire. The magnets G are set radially and concentrically around the armature-drum, and are secured to the side frames by transverse brass or gun-metal bolts G', which extend from one side frame to the other.

H is the commutator, keyed on a sleeve of the armature-drum, and I is a band-pulley, keyed on the other sleeve of the drum. Through this pulley rotary motion is imparted to the armature-drum for the purpose of setting the machine in action.

K is an annular frame carried by and capable of rotation upon the fixed shaft C. This frame carries the holders for the commutator-brushes H', and may be fixed in any required position by means of the screw-clips $k$. The magnets D (see Fig. 7) are so coiled as to constitute them alternately north and south poles, as indicated by the letters N and S. Similarly, the magnets G are so arranged as to present opposing poles to the magnets D, as is also indicated by the letters N S. Both the internal and external magnets are provided with broad pole-pieces, for the purpose of presenting broad magnetic fields to the coils or hanks of the rotating armature, and the ends of the coils of these two sets of magnets are led to a tablet, L, to receive the exciting-current from the commutator-brushes.

Figs. 7 and 8 show that the armature-drum is provided with hanks of insulated wire. Eighteen hanks are here shown, and each hank is composed of two wires, so as to produce two distinct currents; or the number of hanks may be doubled, each hank being formed of a single wire. Thus the eighteen or thirty-six hanks will in either case present a total of seventy-two terminals, which are permanently connected in pairs, each pair with a bar of the commutator H; or each hank may be composed of a single wire, in which case the eighteen hanks are so arranged as to form three layers, each layer containing six hanks.

In Fig. 8 the eighteen hanks are represented as in four layers; but the inner layer, being concealed by the flange or rib at the end of the armature-drum E, is shown in dotted lines. In the first layer, or that next the drum, there are five hanks, in the second layer five hanks, in the third layer five hanks, and in the fourth and outside layer three hanks, thus making eighteen hanks in all.

The construction of the commutator is best illustrated by the detached views, Figs. 9 and 10, which represent it on an enlarged scale. It consists of a brass cylinder, $h$, upon which is fitted a cylinder of vulcanite, $h'$, grooved longitudinally to receive a series of brass bars, $h^2$, in this case thirty-six in number, two for each double coil on the armature. The terminals of these coils are brought down to their respective bars and secured thereto by clamping-screws. These bars are V-shaped in cross-section, and they are severally formed with a beveled recess at each end.

The brass cylinder $h$ is provided at one end with a beveled flange, to receive one of the recessed ends of the bars $h^2$, but is insulated therefrom by means of a vulcanite cone, $h^3$. An annular plate or flange, $h^4$, similarly beveled to fit the opposite ends of the bars $h^2$, and insulated therefrom, is secured to the other end of the cylinder $h$ by bolts $h^5$. By screwing up these bolts, the bars $h^2$ will be drawn down into the grooves in the vulcanite cylinder $h'$ and securely held therein.

We have stated that the hanks $e$ on the armature-drum E extend beyond the plane of the field-magnets to allow of their ends being held down on the periphery of the drum. This is clearly shown in Figs. 4 and 6. The hanks being placed upon the drum as described, their ends are bent (with the application of heat, as above explained) to accommodate them to the overlapping of one hank over the other, and to insure their lying in a close and compact state. A binding-cord is then laid around the covered drum for a breadth somewhat exceeding the length of the field-magnets, in order to secure the hanks in position, and they are severally held down at their ends by metal strips made fast to the drum. As a further security, cap-rings $e'$ are placed over the ends of the hanks and made fast by screws to the armature drum-heads.

In some cases, instead of forming the hanks of double wires, we employ two layers of hanks of single wires, disposed as just described, and by connecting them to the commutator-bars in the manner shown and explained by the consecutive numbers in Fig. 8 we obtain the advantage of causing two currents of the same name running in opposite directions to meet at the same collecting-brush, in the same manner as when we couple the ends of the double-wire hanks. By connecting the terminals of the eighteen hanks of single wires disposed in three layers, as above described, where they are connected so that the end of one hank is on the same commutator-bar with the beginning of the hank next but one following, the meeting under the collecting-brush of two currents of the same name running in opposite directions will also be caused. Thus to take, for example, the double hank, the four terminals of which are numbered, respectively, 1 1* 19 19*, it will be seen that terminal 1 is connected with the bar 1 of the commutator, and the corresponding terminal, 1*, with the bar 1* of the commutator. In like manner the terminal 19 is connected with the bar 19 of the commutator, while the corresponding terminal, 19*, is connected with the bar 19* of the commutator. The disposition of these bars is such that a pair of brushes will be simultaneously in contact with the bars 1 1* and with the bars 19 19*. Each of these bars will, however, be also coupled with a terminal of a hank in which is simultaneously induced a current of the same name flowing from an opposite direction toward the brush. The disposition of the connection we have shown causes this result at each brush, so that six distinct electric currents exist on the rotary armature at one and the same time, and in larger machines, with more magnets, we should have a greater number.

As a further improvement on our dynamo-electric machine, we propose, instead of the six collecting-brushes therein employed (or two for each field) and connected together, to use but one pair of brushes, and to connect the bars, strips, or plates of the commutator in groups of three by means of removable metal coupling-plates insulated the one from the other.

Fig. 11 is an end view of the commutator with the coupling-plates applied thereto. Fig. 12 is a side elevation, and Fig. 13 a partial sectional elevation, of the same. In these figures, $h^2$ are the bars of the commutator H, coupled up, as already explained, with the hanks of the armature. The exposed ends of these bars have sockets formed in them to receive contact-pins projecting from the inner face of a series of coupling-plates, $h^6$. These plates consist of thin pieces of sheet-brass fitted upon the armature-sleeve, but insulated therefrom and from each other. They are packed closely together, and are set in front of the exposed end of the commutator. To each of these plates $h^6$ three contact-pins are fitted at equal distances from each other and at such a radius as to bring them opposite the sockets in the exposed ends of the commutator-bars. The length of these contact-pins will vary for each plate, the pins of the outermost plate having to reach over all the coupling-plates which lie between it and the commutator. It will now be understood that when these coupling-plates are brought up into position, as shown in the drawings, they will couple up the bars $h^2$ in groups of three, thus making virtually a series of twelve terminal plates for the armature, arranged as above described. By this means not only is the friction on the commutator reduced, but the "sparking" due to extra currents is considerably diminished, as is also loss of current from frequent making and breaking contact. This construction of coupler, it will be obvious, is applicable to other forms of commutator than that above described.

Having now explained the nature of our invention, we wish it to be understood that we claim—

1. The method of manufacturing hanks for dynamo-electric machines, consisting in winding them upon a rotating former, heating the hanks by means of currents of electricity to soften the insulating-coating, and molding the hanks while in a soft state by pressure upon the armature-drum and upon each other, substantially in the manner and for the purpose set forth.

2. In a dynamo-electric machine in which the field-magnets are set around and concentric with the armature, a magnetic drum and hanks which extend beyond the ends of the field-magnets and have their ends secured to the periphery of the drum, whereby access to the interior of the drum for the purpose of withdrawing the internal magnets is facilitated, substantially as described.

3. The means above described with reference to Figs. 11, 12, and 13 for grouping the currents derived from armature-coils, consisting of removable grouping-pieces fitted to one end of the commutator and bearing against the ends of two or more of the commutator-bars, such grouping-pieces serving to minimize the sparking and the friction put upon the commutator by the brushes or rubbers, substantially as described.

ELPHINSTONE.
CHARLES W. VINCENT.

Witnesses:
H. K. WHITE,
GEO. H. CANTLE,
  66 *Chancery Lane, London.*